UNITED STATES PATENT OFFICE.

STUART GWYNN, OF NEW YORK, N. Y., ASSIGNOR TO AMERICAN METALINE COMPANY, OF SAME PLACE.

IMPROVED COMPOSITION OF MATTER, CALLED "METALINE," FOR JOURNALS, BEARINGS, &c.

Specification forming part of Letters Patent No. 101,868, dated April 12, 1870; antedated March 30, 1870.

*To all whom it may concern:*

Be it known that I, STUART GWYNN, of the city of New York, in the county of New York and State of New York, have invented a new Composition of Matter, which I denominate "Metaline No. 8," designed for the purpose of journal-boxes, journal-box linings, and other similar articles having surfaces that are intended to be subjected in use to friction.

The nature of my invention consists in combining oxide of tin and bees-wax, or their equivalents, upon the principles and in pursuance of the method fully described and illustrated in the specification annexed to my application for Letters Patent for a process for making metaline, filed in the Patent Office simultaneously herewith, and to which reference is made, whereby I produce a composition of matter having such properties and conditions that so little friction will be caused, and so little heat developed in the practical use of the above-named articles made of it, in machinery and elsewhere in the arts, that the necessity for the application of oil or any other lubricant to their surfaces is entirely obviated.

To make this composition of matter, I take of the oxide of tin ninety-five parts, and of bees-wax five parts. The oxide of tin is found in commerce as a fine powder, and in that state I use it. It is to be intimately incorporated with the bees-wax in a warm mill, by taking, first, about equal proportions, and adding the rest of the oxide of tin a little at a time while the grinding is going on. The mass is then to be subjected to severe pressure in a mold, to give it the required degree of solidity.

In journal-boxes made of or lined with this composition, journals may be practically run at a high rate of speed without a lubricant.

While I intend to limit myself in this specification to metallic oxides for the principal element of said compound, whose conditions need modification to convert it into metaline, other metallic oxides besides oxide of tin, its equivalent for the purpose intended, may be employed, and other agents besides bees-wax, its equivalent for the purpose intended, may be used. So, also, the relative proportions of the oxide of tin and bees-wax, or their equivalents above stated, may be varied within the limits of the process hereinbefore referred to, without departing from the spirit of my invention.

I claim as my invention—

The manufacture or preparation of a composition of matter, which I denominate "Metaline No. 8," when the same possesses the properties and is compounded of the ingredients, or their equivalents, in the proportions, by the process, and for the purposes set forth.

STUART GWYNN.

Witnesses:
J. P. FITCH,
HENRY N. MYGATT.